Sept. 27, 1938.  A. S. BEMIS  2,131,021
CARBONIZED PRODUCT AND MANUFACTURE THEREOF
Filed June 5, 1936
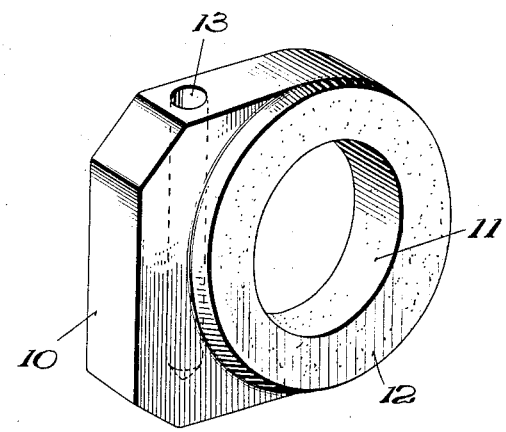
Inventor
Arthur S. Bemis
By Steward & McKay
his Attorneys Patented Sept. 27, 1938

2,131,021

UNITED STATES PATENT OFFICE 2,131,021

CARBONIZED PRODUCT AND MANUFACTURE THEREOF

Arthur S. Bemis, St. Marys, Pa., assignor to Speer Carbon Company, St. Marys, Pa., a corporation of Pennsylvania Application June 5, 1936, Serial No. 83,816

7 Claims. (Cl. 106—7.6)

This invention relates to carbonized products and manufacture thereof. In particular, the invention is concerned with the manufacture of shaped bodies of novel carbon material, e. g. for bearings, shaft packings, motor and generator brushes, in accordance with novel methods of procedure, the resultant carbon material and articles composed thereof possessing highly desirable characteristics, heretofore unattainable or only imperfectly attained, peculiarly advantageous for the purposes mentioned.

Generally described, the process of the invention comprises, essentially, heating finely granular carbon of appropriate type in intimate commixture with easily reducible finely divided metal oxide (or oxides) and a suitable carbonizable binder, ordinarily hydrocarbonaceous (i. e. consisting mainly of hydrocarbons), more particularly a bituminous binder such as pitch or tar, under carbonizing conditions such that decomposition of the hydrocarbon content of the binder is facilitated by such oxide or oxides, with elimination of volatiles and co-deposition of fixed carbonaceous matter and metal in intimate association, said metal being reduced in situ from the oxide or oxides. These co-deposited reaction products thus intimately associated in a state of extremely fine subdivision are disseminated throughout the mass and serve to cement and bond together the finely granular carbon employed in the initial mix to form a finely porous composite structure of carbon and metal, consisting mainly of carbon, which structure is strong and tough as well as suitably dense, hard and resistant to wear, besides possessing certain other highly desirable distinctive characteristics noted hereinafter.

In what is regarded as the best practical embodiment of the invention, the carbonizing operation is further facilitated by employing sulphur (free or in some form, e. g. a metal sulphide, in which it is readily available) as an oxidizing agent in the initial mix in addition to metal oxide. The conjoint action of the metal oxide or oxides and the sulphur is especially effective and advantageous in promoting the desired carbonizing action and in enabling this to be accomplished with minimum loss of carbon and at temperatures substantially lower than have heretofore been regarded as essential to effect carbonization with the necessary or desired completeness. Moreover, the resultant carbon material or product has properties markedly superior to those of generally comparable products made at the far higher carbonizing temperatures heretofore customary.

There have been prior proposals to manufacture carbon material for bearings and the like by heating finely divided carbon, such as pulverized graphite, coke, etc., in mixture with a pitchy binder to temperatures high enough to cause carbonization of the pitchy binder to a greater or less extent depending upon the particular procedure followed. It has also been proposed to employ sulphur in the mix in order to facilitate decomposition of the hydrocarbons of the pitchy binder at relatively low carbonizing temperatures, with elimination of hydrogen sulphide and free carbon, the carbon largely remaining in the mass as a bonding and densifying agent. However, because of practical limitations upon the maximum amount of sulphur that can be used in the mix, partly because it so greatly increases the viscosity of the mix at certain working temperatures, say from 30° to 150° C., it is not feasible to employ it in sufficient quantity to thus oxidize all the hydrocarbons present in the mix. Consequently, whatever specific carbonizing procedure has been followed heretofore, it has always been necessary, in order to achieve substantially complete carbonization, to employ extremely high temperatures, often as high as 1400°–1500° C., during the latter part of the firing. Only in this way could the desired degree of hardness, density and wearing qualities in the resultant carbonized mass be ensured. Not only has this substantially increased the cost of operation, but it has also resulted in carbonized products not altogether satisfactory for the purposes hereinabove indicated. For example, such very high carbonizing temperatures with the usual carbon and pitch binder mix are apt to render the product too dense to be used with best results in self-lubricating carbon bearings. Also, although such a high-temperature carbon product is often very hard, it is commonly rather brittle and lacking in toughness.

It is accordingly a principal object of the present invention to enable production of carbon material of the general type mentioned but of improved properties and characteristics rendering it better adapted for use in the general field indicated; and also to produce such carbon material by relatively simple and economical procedure characterized especially by the employment of lower maximum carbonizing temperatures than have heretofore been regarded as necessary for best results.

A further and more specific object of the invention is to produce improved carbonized products having low friction characteristics and adapted particularly for use in self-lubricating bearings, whereby such bearings may have a wearing surface of suitably porous structure adapted to retain lubricating oil for long periods at high speed under high frictional pressures; and especially to produce automobile clutch bearings possessing the aforesaid desirable characteristics.

Other objects and advantages of the invention will be apparent from the detailed description hereinafter of certain desirable practical embodiments serving as typical to illustrate the underlying principles of the invention, which will then be more particularly pointed out in the appended claims.

One especially important practical application of the invention is in the manufacture of thrust bearings, such as clutch throw-out bearings for motor vehicles. Such bearings are subjected to severe service conditions in practical use. Not only must they be strong and resistant to wear, but they must be dependably self-lubricating over long periods without attention or replenishment of the oil supply. This means that a bearing of this kind should be made of a carbon material possessing, in addition to relatively great strength and toughness, a degree of porosity and a type of pore structure satisfactorily adapting it to hold oil tenaciously and yet permit gradual seepage of lubricant through the mass of carbon material constituting the bearing body to the active bearing surface. But that seepage must be only at a very limited rate sufficient to provide the necessary lubrication without wastage of lubricant, since otherwise the bearing would quickly become unserviceable. The present invention makes possible the production of an exceptionally satisfactory bearing of this kind which, in addition to possessing oil-retaining power in high degree while permitting slow oil seepage, has the further advantage of possessing inherent anti-friction properties by reason of its including, as a minor constituent of the bearing material, a metal which contributes a lubricating effect. Moreover, in the novel method of manufacturing said material, such metal is co-deposited with the binder carbon from the hydrocarbonaceous binder employed and functions to modify advantageously the nature of the pore structure of the carbonized mass.

Accordingly, in further explaining the underlying principles of the invention, reference will be made particularly to the manufacture of carbon material adapted more especially for embodiment in such a bearing, and to bearings composed thereof; but it is to be understood that this is merely by way of illustration and that the invention is of much broader scope, extending to other carbonized materials in the same general class but of compositions differing specifically therefrom, as well as to other shaped bodies or articles formed of such materials.

When the invention is employed in the manufacture of carbon bearings, the major constituent of the starting mix is very finely divided carbon of suitable character. A substantial, most desirably preponderating, part of this carbon should be of a hard, dense and definitely granular type such as calcined petroleum coke; while the remainder is advantageously graphitic in character, a natural graphite (e. g. Mexican graphite) being well suited for the purpose. Of the remaining constituents, a pitchy binder such as hard coal tar pitch is the largest, commonly amounting to from one-third to one-half of the weight of the carbon used. The next largest is a suitable metallic oxide or mixture of oxides. Assuming the use of red lead ($Pb_3O_4$), which is especially advantageous, this desirably amounts to at least 5 per cent of the weight of the carbon, but usually not more than 25 per cent. Where sulphur is included in the mix, as is ordinarily to be recommended in practice for attainment of best results, this constituent may amount to as much as 10 or 12 per cent of the quantity of carbon, although usually around 7 to 8 per cent is sufficient and better practice. Smaller proportions of sulphur give satisfactory results in some cases, especially with lower proportion of pitchy binder than above specified; and it is often feasible, although less desirable, to omit the sulphur altogether. The specific composition and proportioning of the starting mix may therefore vary rather widely within the scope of the invention, depending upon the particular character of product desired and its intended use.

It is desirable that the graphitic component of the initial mix be of the so-called amorphous type, such as Mexican graphite because its comparatively non-crystalline, non-flaky structure permits the use of a much higher percentage of binder in the mix, and higher molding pressures, without formation of slippage planes, than is possible with flaky, crystalline graphite such as that from Ceylon or Madagascar, for example.

Typical preliminary mixes from which carbonized material of outstanding excellence can be manufactured in accordance with the principles of the invention may be constituted substantially as follows:

| | Parts by weight | |
| --- | --- | --- |
| | Optimum | Most desirable permissible range |
| Calcined petroleum coke flour | 67 | 65 to 70 } 100 |
| Amorphous Mexican natural graphite flour | 33 | 35 to 30 |
| Sulphur | 7.6 | 6 to 9 |
| Hard coal tar pitch | 47.6 | 35 to 50 |
| Red lead | 19.1 | 18 to 20 |
| Benzol | 7.2 | 6 to 9 |

For certain purposes, especially for automobile clutch throw-out bearings, carbonized material prepared as hereinabove described from an initial mix constituted and proportioned approximately in accordance with the typical formulae just given is peculiarly well adapted, especially if the maximum carbonizing temperature employed does not exceed about 900° C. The indicated optimum proportioning, in particular, gives the right balance in the finished product between the all important properties of frictional characteristics, resistance to wear, and ability to retain oil tenaciously but still permit adequate seepage. The extreme hardness characteristic of the calcined petroleum coke is tempered somewhat by diluting it with a lesser quantity of the graphite. Screening the mixed carbon flour paricles to predetermined size enables regulation and control of the fundamental pore size, which latter is then controllably modified to the desired extent through the deposit of reduced metal along with cement carbon from the hydrocarbon binder in the mass during the carbonizing operation. Moreover, the use of an amorphous type of graphite, in association with carbon of the coke type, is important further because the combination results in a much stronger product. The relatively high ash content of an amorphous graphite, such as Mexican graphite, is not disadvantageous but on the contrary is useful because it acts as a mild abrasive or polishing agent to keep the contacting surfaces free from a high friction film. The use of so-called amorphous graphite in conjunction with coke also allows the use of a higher percentage of binder in the mix, which is a further advantage as already mentioned hereinabove.

The ingredients employed should be thoroughly commingled and blended, ordinarily with the aid of a solvent for the binder (e. g. pitch), and with moderate heating, into a substantially homogeneous mixture from which the bearings or other articles to be made can be preliminarily shaped, as by molding or extruding, preparatory to baking and carbonizing. Both the coke and graphite are finely divided (e. g. 98% through 200-mesh sieve) as by grinding, and the sulphur and metal oxide are also pulverulent. To a properly proportioned mixture of these substances the pitch may be added, usually in melted condition, and only enough benzol or other pitch solvent is added to facilitate distributing the binder throughout the mix and properly coat the mix particles therewith, and to give the mixture the consistency of soft mush without rendering it syrupy. The mixing may be accomplished to best advantage in a simple type of mixer (e. g. Werner & Pfleiderer or Day type) which thoroughly mixes the ingredients by a kneading rather than grinding action. Grinding the mixture while wet is undesirable as tending unduly to break down the structure of the coke particles.

The mixing having been completed, the solvent is distilled off and recovered, after which the mix is cooled. The resultant material is thermoplastic by reason of its content of hard pitch binder. Upon being moderately heated it may be molded or otherwise formed into shapes preparatory to carbonizing. In preparing this thermoplastic material for molding, the cooled mass, which is relatively hard, is ground or crushed suitably fine for molding purposes, the desired fineness being controlled by screens. The screened mixture is then molded under pressure more or less approximately into the desired final shape in any suitable way as, for example, by use of a mold heated to such a temperature as will give the carbon mixture proper molding plasticity. The shaped bodies thus obtained are then baked at gradually increasing temperatures, attaining a maximum sufficiently high to effect substantially complete carbonization. In the practice of the present invention, this is accomplished at relatively low maximum baking temperatures within the approximate range of 800° C. to 1250° C., and ordinarily not exceeding 1000° C. Particularly good results are obtained in practice when the maximum lies between about 875° and 925° C., a maximum of around 875° being notably effective in cases where the initial mix has substantially the composition indicated as optimum in the table hereinabove given. Although even these relatively low carbonizing temperatures are much higher than the melting point of lead, the metallic lead resulting from reduction of the oxide during the baking or carbonizing operation is so widely dispersed throughout the mass of carbon material that, especially when the proportioning of the initial mix approximates that above indicated as most desirable, the reduced lead is tenaciously held within the mass without loss, substantially as deposited.

The carbonized shapes, if in the form of blanks approximating more or less nearly the over-all dimensions of the bearing or other article to be manufactured, are then brought to final form and dimensions by grinding or other suitable machining operations.

While the reactions occurring during the described carbonization are complex and not fully understood, the action of the sulphur in assisting breakdown of the hydrocarbons present, with production of cement or binder carbon, apparently occurs for the most part at temperatures (e. g. 200°–350° C.) substantially below the maximum baking temperatures; while that of the lead oxide or other metal oxide, especially in the absence of available sulphur, seems to occur chiefly at higher temperatures and, where sulphur is used, to be effective in causing decomposition of the hydrocarbons still remaining after the action of the sulphur. When both sulphur and metal oxide are employed, their respective actions appear to occur simultaneously to a considerable extent and to be mutually modifying. It is probable that, in the presence of sulphur or a sulphur-yielding compound, the metal oxide employed is enabled to exert its decomposing action on the hydrocarbons at temperatures much lower than would otherwise be required; while, in the presence of the metal oxide, the decomposing action of the sulphur, may be more far-reaching and complete at relatively low baking temperatures than when sulphur alone is used as in prior practice. Whether or not this is the correct explanation of what occurs is immaterial, the invention not being dependent upon any particular theory of operation. In any event, employment of sulphur and metal oxide together in the manner herein described is found as a practical matter to enable production of substantially completely carbonized material and shaped bodies thereof having very superior properties, as stated, and achievement of this result at the relatively low maximum carbonizing temperatures indicated. The carbonized material is of a very finely porous yet dense, strong structure that is relatively tough and non-brittle. Microscopic examination indicates a deposit of an extremely fine, strong carbon intimately associated with metal, e. g. lead, distributed throughout the finely granular mass along the pore walls and adhering thereto, this carbon-metal deposit evidently serving to cement or bond together the particles of the carbon materials employed in preparing the initial mix. The relatively small percentage of the reduced metal present in the carbonized material not only contributes structural strength and anti-friction value to the material, but it also partly fills in the minute pores in the mass and diminishes their size to an extent that markedly increases the power of the material to retain lubricating oil. At the same time, there remains sufficient porosity to permit seepage of lubricating oil through the material at a rate sufficiently great to adapt the material exceptionally well for bearings, for example. Therefore, while the material is structurally strong and hard, as well as tough and non-brittle, it is not characterized by the excessive density and resistance to oil flow that has characterized carbon materials heretofore known and customarily produced by methods which involve excessively high molding pressure, or high carbonizing temperatures of the order of 1500° C., or both.

Although inclusion of sulphur in the mix to be carbonized is an important feature of the invention in its most desirable practical embodiments, this is not indispensable in the broader aspects of the invention. Even where sulphur is omitted, the inclusion of a metal compound oxidant, such as red lead, affects very desirably the carbonizing of the hydrocarbonaceous binder and enables the carbonizing to be completed at maximum temperatures well below those customarily used heretofore in obtaining a comparable degree of carbonization. In general, however, it is found less easy to control and regulate the progress of the carbonizing treatment and the characteristics of the resultant product where the sulphur is omitted; but since the benefits of the invention can be realized to a substantial extent without employing sulphur, the invention in its broader aspects is not restricted thereto.

A typical instance of an initial mix from which sulphur is omitted but the employment of which falls within the scope of the broad invention, is as follows:

|  | Parts |
|---|---|
| Calcined coke flour | 67 |
| Amorphous graphite flour | 33 |
| Hard coal tar pitch | 41.6 |
| Red lead | 9.5 |
| Benzol | 7.2 |

This is of course only typical of such mixtures, it being permissible to vary the proportions of the several ingredients within rather wide limits depending upon the particular characteristics desired in the final product.

Although an oxide of lead, specifically red lead, has been more particularly mentioned in the foregoing description, as a suitable metal compound oxidant, particularly because of the ease with which it parts with its oxygen and also because the small quantity of metallic lead distributed throughout the resultant carbonized material imparts some anti-friction properties thereto, the use of easily reducible oxides of other metals, especially those that are relatively soft, such as copper, tin, antimony, cadmium, for example, is feasible and is to be understood as within the scope of the broad invention. Such oxides are reactive with a hydrocarbonaceous binder at different temperatures well within the carbonizing temperature range herein contemplated, to facilitate carbonization and to undergo reduction with liberation of metal distributed throughout the mass and having anti-friction value to a greater or less extent, the action being in general comparable with that of red lead or other oxide of lead. Two or more such oxides may be employed instead of a single oxide, resulting in liberation of two or more metals in the form of a mixture or alloy which may have special value in the finished product for imparting anti-friction properties. A mixture of oxides of lead, antimony and tin, for example, yields a mixture of these metals particularly suited for use in bearings produced in accordance with the invention, and the distribution of such a metal mixture or alloy throughout the carbonized material of the present invention affords distinct advantages.

A typical example of a shaped body of carbonized material produced in accordance with the principles of the invention is illustrated in the accompanying drawing which shows, in perspective, a carbon bearing of a type adapted for use as a clutch throw-out bearing for motor vehicles. The bearing consists of an integral mass of the novel carbonized material of the invention in the form of a molded block or body 10 provided with a circular opening 11 therethrough to receive the clutch shaft (not shown), this opening being surrounded by the flat annular thrust bearing surface 12. In the particular embodiment here illustrated the bearing block or body is further provided with a recess or cavity 13 bored or otherwise formed therein to serve as a reservoir for lubricating oil to be gradually fed to the active bearing surface by gradual seepage through the finely porous carbonized material. Such a bearing has pronounced advantages over carbon bearings heretofore available in the art for reasons hereinabove pointed out. It is hard, strong, tough and highly resistant to wear, successfully withstanding extremely severe service conditions, such as high pressure and high speed, for long periods of time without overheating, becoming high-friction or losing all of its lubricant. In this connection it should be noted that the reduced metal uniformly distributed throughout the material of the bearing increases its ability to dissipate heat.

The carbonized material of the present invention is well adapted also, because of its strength and toughness, and because of the increased electrical conductivity imparted by its distributed metal content, for use in the manufacture of motor and generator brushes in certain classes of service where the brush contact drop is required to be substantially less than that of the usual carbon brush. The uniformity with which the metal, reduced in situ, is distributed throughout the carbonized material of the present invention gives it a distinct advantage as a brush material over so-called metal-carbon and metal-graphite which is prepared by carbonizing mixtures of carbon and metal powders with a pitchy binder.

What is claimed is:

1. The process of producing carbon material suitable for bearings, shaft packings, brushes and the like, which comprises baking an intimate mixture comprising finely divided carbon, a metal oxide and sulphur with a bituminous binder at carbonizing temperature not substantially exceeding 1000° C. until carbonization is substantially complete and metal is reduced from the oxide.

2. The process defined in claim 1, wherein the metal oxide employed is an oxide of lead.

3. The process defined in claim 1, wherein the metal oxide employed is red lead.

4. The process of producing carbon material suitable for bearings, shaft packings, brushes and the like, which comprises baking an intimate mixture comprising finely divided carbon in the form of petroleum coke and graphite, a metal oxide, sulphur and a bituminous binder, and carbonizing the mixture at temperatures attaining a maximum of between 800° C. and 1250° C.

5. The process of producing carbon material suitable for bearings, shaft packings, brushes and the like, which comprises baking an intimate mixture comprising finely divided carbon in the form of petroleum coke and graphite, a metal oxide, sulphur and a bituminous binder, and carbonizing the mixture at temperatures attaining a maximum of between 800° C. and 1000° C.

6. The process defined in claim 4, wherein petroleum coke constitutes the major part of said finely divided carbon, while for each 100 parts by weight of said carbon there are employed, approximately, 18 to 20 parts lead oxide, 6 to 9 parts sulphur, and 35 to 50 parts pitch.

7. The process defined in claim 4, wherein petroleum coke constitutes about two-thirds of said finely divided carbon, while for each 100 parts by weight of said carbon there are employed, approximately, 19 parts red lead, between 7 and 8 parts sulphur, and between 47 and 48 parts hard, coal tar pitch; and wherein the maximum carbonizing temperature attained is between about 875° and 925° C.

ARTHUR S. BEMIS.